(12) United States Patent
Wolczko et al.

(10) Patent No.: US 6,401,137 B1
(45) Date of Patent: Jun. 4, 2002

(54) METHOD, APPARATUS, AND ARTICLE OF MANUFACTURE FOR PROCESSING A VIRTUAL CALL IN A MULTI-THREADED PROGRAM

(75) Inventors: Mario Iwan Wolczko, Palo Alto; Ross Charles Knippel, Half Moon Bay, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/106,879

(22) Filed: Jun. 30, 1998

(51) Int. Cl.$^7$ ................................................. G06F 9/54
(52) U.S. Cl. ...................................... 709/315; 711/200
(58) Field of Search ................................. 709/331, 332, 709/315; 711/133, 150, 200, 1–121; 717/10; 712/1–300

(56) References Cited

U.S. PATENT DOCUMENTS

| | | | | |
|---|---|---|---|---|
| 5,365,606 A | * | 11/1994 | Brocker et al. | 709/305 |
| 5,404,484 A | * | 4/1995 | Schlansker et al. | 711/133 |
| 5,590,326 A | * | 12/1996 | Manabe | 711/150 |
| 5,613,120 A | * | 3/1997 | Palay et al. | 395/710 |
| 5,659,751 A | * | 8/1997 | Heninger | 709/305 |
| 6,029,207 A | * | 2/2000 | Heninger | 709/305 |

FOREIGN PATENT DOCUMENTS

CA 2097541 6/1993

OTHER PUBLICATIONS

Efficient Implementation of the Smalltalk–80 System, by L. Peter Deutsch and Allan M. Schiffman, 1983, pp. 297–302.
Architecture of SOAR: Smalltalk on a RISC, by David Ungar, et al., 1984 IEEE, pp. 188–197.
Addressing and Alternate Address Spaces, 8.3, p. 119.

* cited by examiner

Primary Examiner—St. John Courtenay, III
Assistant Examiner—Van H. Nguyen
(74) Attorney, Agent, or Firm—Finnegan, Henderson, Farabow, Garrett & Dunner, L.L.P.

(57) ABSTRACT

Methods, systems, and articles of manufacture consistent with the present invention process a virtual call during execution of a multi-threaded program by ensuring that the steps of patching the virtual call to the appropriate method are performed within a single instruction cycle. This prevents other threads from executing instructions related to the virtual call in the middle of the patching procedure. Methods, systems, and articles of manufacture consistent with the present invention identify a target, such as a targeted method and a class of a receiver object, associated with the virtual call and then determine an address identifier, such as a memory address pointer to the class of the receiver object. By ensuring that the address identifier is within a restricted address space, a predetermined boundary of the memory storage device can be used to patch the call to the identified target and patch the address identifier for the identified target to the correct address identifier within a single instruction cycle.

23 Claims, 3 Drawing Sheets

METHOD, APPARATUS, AND ARTICLE OF MANUFACTURE FOR PROCESSING A VIRTUAL CALL IN A MULTI-THREADED PROGRAM

BACKGROUND OF THE INVENTION

A. Field of the Invention

This invention relates to systems for processing a virtual call in a multi-threaded environment and, more particularly, to systems for processing a virtual call during execution of a multi-threaded program using a memory storage device having a predetermined boundary in order to atomically patch the virtual call to an appropriate method.

B. Description of the Related Art

In object-oriented programming, a "class" provides a template for the creation of objects. Each class shares certain attributes determined by the class. These attributes typically include a set of data fields and a set of methods. The data fields hold values for an object and the methods define operations for manipulating these values of the object.

When a call is made to an object's method, a compiler determines the appropriate method to use. Sometimes, the compiler can easily do this because the method called is static, i.e., is bound to a determined definition of the method in a specific object class. However, when the method is not static (i.e., the method is a virtual method), binding of the particular method to the specific object class is dynamic and more complex but provides the object-oriented programmer with a greater degree of flexibility. In particular, those skilled in the art will realize that using virtual methods allows a programmer the flexibility to execute completely different methods using the same virtual call.

A call to a virtual method is typically referred to as a virtual call. When a virtual call is made, dynamic binding of the virtual call to the appropriate definition of the target method is performed. One technique for binding a virtual call is to use a conventional inline cache as described in an article entitled "Efficient Implementation of the Smalltalk-80 System" by L. Peter Deutsch and Allen M. Schiffman and published by the Association for Computing Machinery (ACM) in 1983. Those skilled in the art will recognize that in an implementation of a conventional inline cache, a direct call is made to the last method invoked at a call site. A call site is defined as the location in a program at which a virtual call is made. The initial state of the call site is to invoke a binding routine, which determines the appropriate method associated with the virtual call from the class of a receiver object in the virtual call. The binding method then patches the call site, which dynamically binds the call to the appropriate method so to invoke the appropriate method.

In an implementation of an inline cache, the prologue of each virtual method compares the class of the receiver object to the class last used at that call site. If the classes do not match, a programmatic branch is taken to the binding routine, which determines the correct method for the virtual call and then patches the call site accordingly.

Unfortunately, various problems may be encountered when processing such a virtual call within a multi-threaded environment. A multi-threaded environment is essentially a programming environment where a computer program or application, also referred to as a multi-threaded program, is partitioned into logically independent "threads" of control that can execute in parallel. Each thread includes a sequence of instructions and data used by the instructions to carry out a particular program task. When employing a computer system with multiple processors, each processor may execute one or more threads depending upon the number of processors to achieve multi-processing of the program.

When attempting to patch a virtual call to a method during execution of a multi-threaded program, problems may occur because another thread may be executing the same instruction being patched. Furthermore, on some computer architectures, processing the virtual call to patch the call to the appropriate method can be complicated and undesirably slow because of the number of items to patch (e.g., the appropriate method and a large address identifier or pointer) as well as the unspecified amount of time it takes to propagate to the inline caches on other processors.

One way to resolve this problem is to stop any threads from entering the sequence of instructions being patched by suspending execution of all threads. Unfortunately, suspending execution of all threads undesirably affects the performance of the system by slowing execution of the multi-threaded program as a whole.

Another way to resolve this problem is to perform a conventional "lock out" sequence related to the call sequence when patching the instructions. While this also prevents any other thread from interrupting the patching call sequence, it requires a large overhead of instructions to be executed before and after the locked out patching call sequence. Thus, such a conventional "lock out" is also undesirable because of the slow performance of handling a virtual call.

Accordingly, there is a need for a system within a multi-threaded environment that efficiently processes a virtual call and allows one thread to patch the instructions of the virtual call while other threads may be safely and quickly executing the instructions.

SUMMARY OF THE INVENTION

Methods, systems, and articles of manufacture consistent with the present invention overcome the shortcomings of existing virtual call processing techniques by patching the instructions related to the virtual call within a single instruction cycle so that the patching process is not interruptible and is atomic. Methods, systems, and articles of manufacture consistent with the present invention, as embodied and broadly described herein, identify a target associated with a virtual call. A target is typically a targeted method defined by a class of receiver object, which is associated with the virtual call. Next, an address identifier is determined that is associated with the identified target. In particular, the address identifier may be a pointer to a memory address location within a restricted address space for maintaining the class of the receiver object. Once the target has been identified and the address identifier is determined, the virtual call and the address identifier (more particularly, instructions related to each of these) are placed within a predetermined boundary of a memory storage device. Once placed within the predetermined boundary, the virtual call is patched to the target and the contents of a memory storage device are patched to a value of the address identifier during a single instruction cycle.

In accordance with another aspect of the present invention, methods, systems, and articles of manufacture, as embodied and broadly described herein describe, a virtual call processing system having a memory storage device having a predetermined boundary and capable of being updated within a single instruction cycle. The system also includes a processor coupled to the memory storage device. The processor is capable of updating the memory storage device within the single instruction cycle and configured to execute the multi-threaded program. During execution of the multi-threaded program, the processor is also operative to detect the virtual call, identify a target associated with the virtual call, and determine an address identifier associated with the target. The address identifier is within a restricted address space typically maintaining a class of an object related to the virtual call. The processor is also operative to place the virtual call and the address identifier within the predetermined boundary of the memory storage device. In such a configuration, the processor is then operative to, within a single instruction cycle, patch the virtual call to the target and patch the contents of the memory storage device to the value of the address identifier. More particularly stated, the processor may atomically update both a call instruction to reflect the targeted method and update a set instruction to reflect the value of the address identifier without allowing other threads to execute the updated call instruction with a non-updated address identifier or vice versa.

In accordance with yet another aspect of the present invention, methods, systems, and articles of manufacture, as embodied and broadly described herein, describe a computer-readable medium, which contains instructions for processing a virtual call during execution of a multi-threaded program. When the instructions are executed, a target is identified that is associated with the virtual call. Next, an address identifier associated with the target is identified. The address identifier is within a restricted address space, typically for maintaining a class of object related to the target. The virtual call and the address identifier are then placed within a predetermined boundary of a memory storage device. Thereafter and during a single instruction cycle, the virtual call is patched to the target while the contents of the memory storage device are patched to reflect the value of the address identifier.

BRIEF DESCRIPTION OF THE DRAWINGS

The accompanying drawings, which are incorporated in and constitute a part of this specification, illustrate an implementation of the invention. The drawings and the description serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.
Introduction In general, methods and systems consistent with the present invention process a virtual call during execution of a multi-threaded program by ensuring that the steps of patching the virtual call to the appropriate method are performed within a single instruction cycle. By doing so, other threads are prevented from undesirably executing instructions related to the virtual call in the middle of the patching procedure.

In more detail, a target (such as a targeted method and a class of a receiver object related to the virtual call) is identified. A target is generally defined to be any indication of which method should be executed by the virtual call. In this manner, the appropriate or targeted method to be "dynamically bound" to the virtual call can be identified as being defined by the class of the receiver object. Next, an address identifier (such as a memory address pointer to the class of the receiver object) is determined. The address identifier is typically defined to be a pointer to the class of the receiver object, which defines the targeted method. If the definition of the targeted method is maintained within a restricted address space, the size of the address identifier can be advantageously reduced. Furthermore, by maintaining the object classes within such a restricted address space, the number of instructions required for patching the virtual call can also be advantageously reduced. Thus, by ensuring that the address identifier is within the restricted address space, a predetermined boundary of the memory storage device can be used to patch the call to the identified target and patch the address identifier for the identified target to the correct address identifier within a single instruction cycle.

Figure 1:
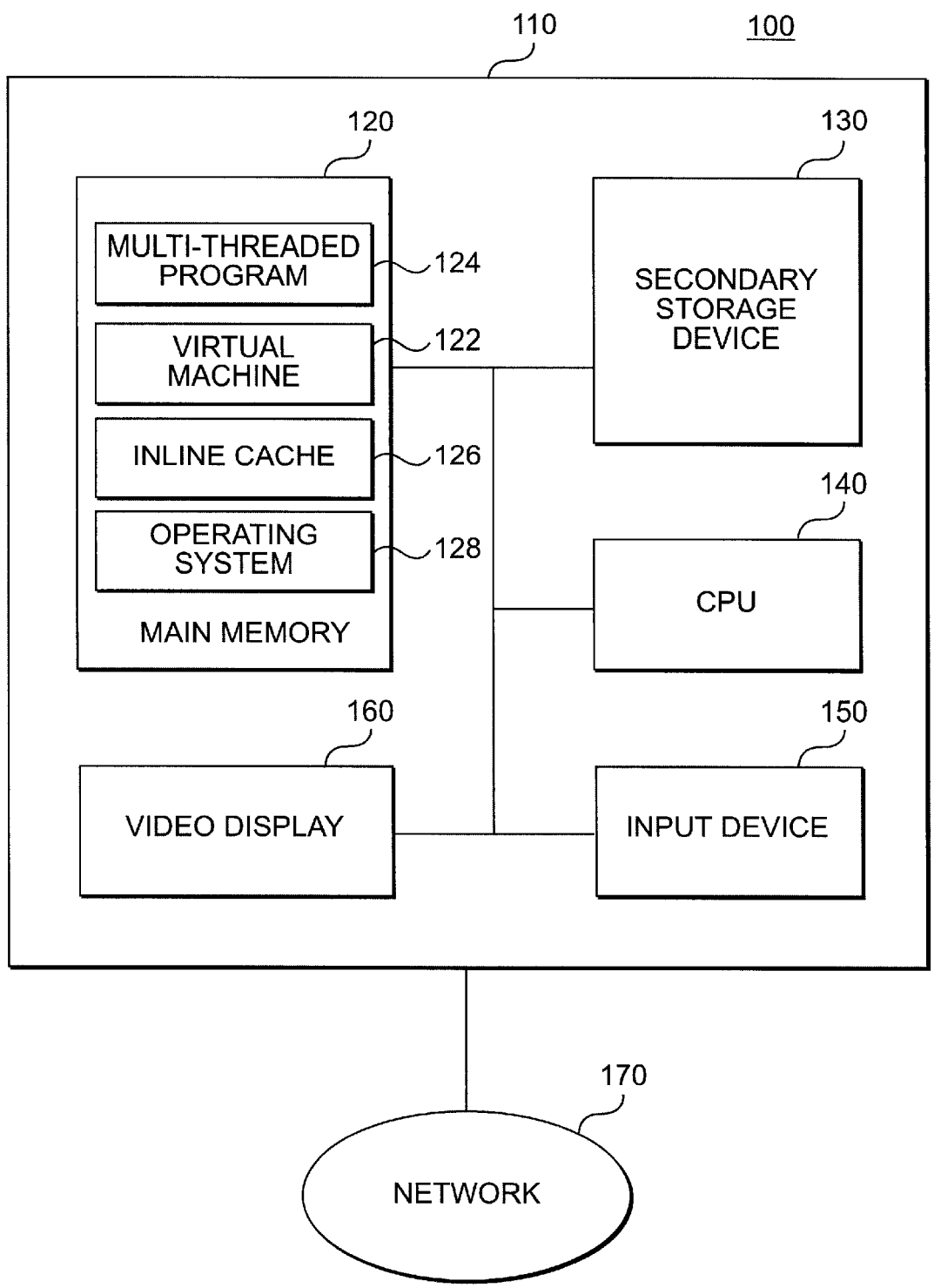
FIG. 1 is a block diagram of an exemplary computer system with which the invention may be implemented.

Those skilled in the art can appreciate that performing the patching process in a single, atomic (functionally uninterruptable) operation limits the ability of other threads to execute the same instructions in the midst of being patched. Accordingly, one thread can effectively and efficiently patch the code at the call site while other threads may be safely executing it without the opportunity of an erroneous execution of a virtual call (i.e., execution of the virtual method using an incorrect definition of the method).
Computer Architecture FIG. 1 depicts an exemplary data processing system 100 suitable for practicing methods and implementing systems consistent with the present invention. Referring now to FIG. 1, data processing system 100 includes a computer system 110 connected to a network 170, such as a Local Area Network, Wide Area Network, or the Internet.

Computer system 110 contains a main memory 120, a secondary storage device 130, a central processing unit (CPU) 140, an input device 150, and a video display 160, each of which are electronically coupled to the other parts of computer system 110. Main memory 120 contains an operating system 128, a virtual machine (VM) 122, and a multi-threaded program 124. An exemplary VM 122 for purposes of this description is a Java™ Virtual Machine (JVM), which is part of the Java™ runtime environment included in the Java™ software development kit (JDK). The JDK is available from Sun Microsystems of Palo Alto, Calif. In general, the JVM acts like an abstract computing machine, receiving instructions from programs (such as multi-threaded program 124) in the form of bytecodes. A bytecode is essentially a compiled format for a general purpose program, such as a program written in the Java™ programming language. Once the instructions or bytecodes have been received, the JVM interprets these bytecodes by dynamically converting them into a form for execution, such as object code, and executes them.

This execution scheme for programs, such as programs written in the Java™ programming language, facilitates the platform independent nature of the JVM. Further details on the JVM can be found in a number of texts, including Lindholm and Yellin, *The Java Virtual Machine Specification*, Addison-Wesley, 1997, which is hereby incorporated by reference.

An inline cache 126 implements a more generally described memory storage device. Such a memory storage device has a predetermined boundary and is capable of updating information stored within the predetermined boundary in a single instruction cycle. In an exemplary embodiment consistent with the present invention, computer system 110 is implemented using a SPARC™ computer architecture. Those skilled in the art will recognize that the SPARC™ computer architecture from Sun Microsystems of Palo Alto, Calif. is designed such that, from a memory addressing and address space perspective, all updates to a double-word address space (8 bytes) aligned on a 8-byte address boundary will be atomic. More generally stated, all reads and writes within a predetermined boundary (such as the double-word address space) of such a memory storage device are guaranteed to be functionally indivisible, uninterruptable and nearly simultaneous. Further details regarding the SPARC™ computer architecture can be found in a number of texts, including the SPARC™ V9 Reference Manuals available from SPARC International of Menlo Park, Calif., which are hereby incorporated by reference.

Although the memory storage device, such as inline cache 126, is shown as part of main memory 120, other implementations consistent with the present invention may allow the memory storage device to be a separate device. An example of such a separate device includes a dedicated register or any other computer-readable medium capable of maintaining datum and being updated within a single instruction cycle. Additionally, one skilled in the art will appreciate that although one implementation consistent with the present invention is described as being practiced in conjunction with a JVM, systems and methods consistent with the present invention may also be practiced in an environment other than a Java™ environment.

Furthermore, one skilled in the art will appreciate that all or part of systems and methods consistent with the present invention may be stored on or read from other computer-readable media, such as secondary storage devices, like hard disks, floppy disks, and CD-ROM; a carrier wave received from the Internet; or other forms of ROM or RAM. Finally, although specific components of data processing system 100 have been described, one skilled in the art will appreciate that a data processing system suitable for use with the exemplary embodiment may contain additional or different components, such as multiple processors and a variety of input/output devices.

Virtual Call Processing System

Figure 2:
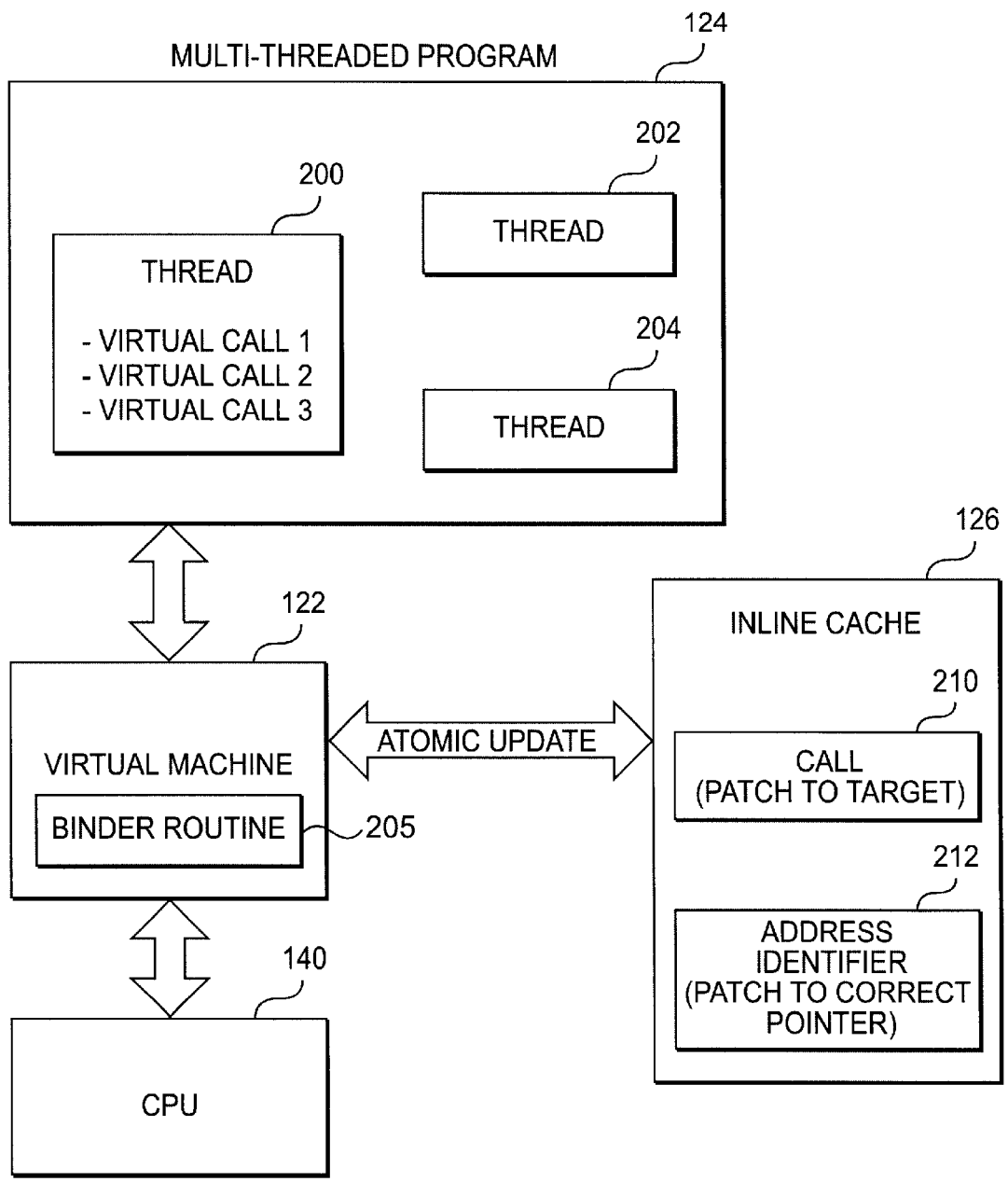
FIG. 2 is a block diagram of a virtual call processing system for use with multi-threaded programs consistent with an exemplary embodiment of the present invention.

FIG. 2 is a block diagram of a virtual call processing system consistent with the principles of the present invention. Referring now to FIGS. 1 and 2, the virtual call processing system is used in a multi-threaded environment, such as when multi-threaded program 124 is being executed by CPU 140. As shown in FIG. 2, multi-threaded program 124 consists of multiple threads 200, 202, and 204. Utilizing VM 122, such as the JVM, or a facility of operating system 128, such as "WINDOWS NT" or "WINDOWS 95" distributed by Microsoft Corporation of Redmond, Wash. or "SOLARIS" distributed by Sun Microsystems of Palo Alto, Calif., CPU 140 concurrently executes threads 200, 202, and 204.

During execution of one of the threads 200, CPU 140 (utilizing VM 122) detects that a call is made to a virtual method (i.e., a virtual call). Upon detection, CPU 140 typically compiles the virtual call to turn the bytecodes of the virtual call into a machine readable and executable form of instructions. Typically, the instructions include a call to a binding routine 205, a delay slot, and additional instructions setting the value of a memory storage device, such as inline cache 126, with an address identifier.

CPU 140 calls binding routine 205, which is part of VM 122, essentially to determine what is really meant to be called (the target) and then to patch the virtual call to the target and to patch the contents of inline cache 126 with the address identifier. If it is ensured that the class definitions are maintained within a restricted address space, the size of the address identifier can be minimized. In this manner, call 210 and address identifier 212 related instructions cleverly fit within a predetermined boundary of inline cache 126. Thus, by fitting within the predetermined boundary, the instructions are updated in a single instruction cycle in a nearly simultaneous manner.

The predetermined boundary is selected based on how much memory can be read or written to atomically or, more generally stated, within a single instruction cycle. In the preferred embodiment, CPU 140 is capable of atomically updating (reading or writing to) a double-word boundary (a predetermined boundary) of inline cache 126 (a memory storage device). In this configuration, CPU 140 is then capable of nearly simultaneously updating the call instruction to the targeted method and updating the address identifier related instruction (set instruction) to the correct pointer value related to the class defining the targeted method. Thus, call 210 and address identifier 212 related instructions can be updated or patched within a single instruction cycle after being placed within the double-word boundary of inline cache 126.

Once both the call and the address identifier contents of inline cache 126 have been patched, the virtual call can then be properly executed by thread 200. In this manner, the risk of a mismatched condition is avoided without the need to halt execution of all of the other threads 202, 204.

In an example, CPU 140 detects virtual call 1 from thread 200. This virtual call has a receiver object X and a targeted method F as part of the virtual call. Those skilled in the art will be familiar with virtual calls and virtual methods, including receiver objects and targeted methods, consistent with object-oriented programming languages, such as the Java™ programming language.

In order to avoid unnecessarily and repeatedly binding the same definition of a specific method, such as method F, to a virtual call targeting the same method, an embodiment consistent with the present invention first determines whether the class of the receiver object is the same as the class of the last receiver object used. If the classes are the same, then there is no need to patch the instructions and the virtual call to method F can be executed using the definition of method F from the class of the last receiver object. However, if the classes are not the same, it is necessary to call binder routine 205 and determine which definition of method F to use for this virtual call.

When binder routine 205 is called, binder routine 205 looks to the call site or location within executing thread 200 from which the virtual call was made. Next, binder routine 205 identifies the target of the virtual call from the receiver object in the virtual call. More specifically, binder routine 205 looks for the class of receiver object X and determines the appropriate definition of targeted method F from this class. Additionally, binder routine 205 determines an address identifier associated with the target and within a restricted address space. In an embodiment using a SPARC™ computer architecture, the pointer is a 32-bit value. However, by using the restricted address space, the low order 10 bits of this pointer (i.e., the class address) will be zero and can be omitted from consideration and further processing. As a result, the number of instructions required to set the value of the address identifier to the correct value is reduced. In the example, an exemplary value for the address identifier associated with virtual call 1 is 2000.

At this point, traditional virtual call processing systems would be required to take multiple instruction cycles to patch the call instruction and the instructions which set the contents of inline cache 126. However, in accordance with the principles of the present invention, the patching process is specifically designed to update a virtual call within a single instruction cycle. In the example, CPU 140 is able to patch the virtual call to be a call instruction for the targeted method F as defined by class X and to patch the address identifier setting instruction to the value 2000 (i.e., a pointer to the class X) using a double-word boundary of inline cache 126. Finally, CPU 140 is able to execute the virtual call using the patched instructions to properly identify the targeted method F and execute it.

In another virtual call, such as virtual call 2, the targeted method is still method F but the receiver object associated with the virtual call is object Y instead of object X. Thus, in order for virtual call 2 to be properly processed, the definition of method F as defined in the class of receiver object Y must be bound or patched to the virtual call without allowing other threads 202, 204 to interrupt the patching process. Binder routine 205 is called again to identify that the target includes targeted method F as defined in the class of receiver object Y and to determine that the address identifier for the class of object Y is 3000. Thus, the instruction to call method F is atomically patched or updated while the instruction to set the contents of the inline cache is patched or updated to reflect an address identifier value of 3000 instead of 2000 for method F.

Virtual Call Process

Figure 3:
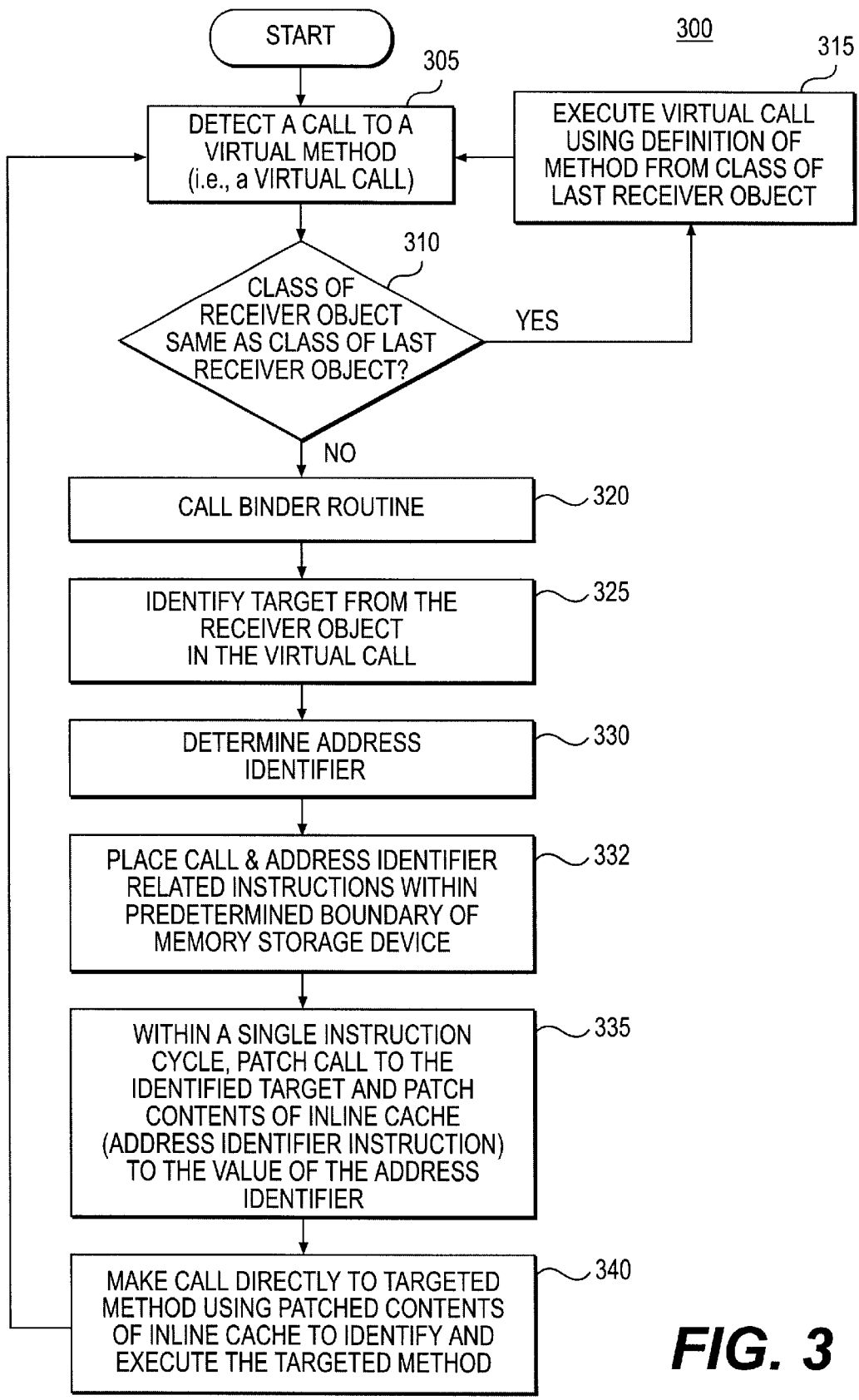
FIG. 3 is a flow chart illustrating typical steps performed by the virtual call processing system consistent with an exemplary embodiment of the present invention.

Further details on steps of an exemplary method in accordance with the present invention for processing a virtual call will now be explained with reference to the flow chart of FIG. 3. Referring now to FIGS. 1–3, the method 300 begins at step 305 when a call to a virtual method is detected. VM 122 executes the prologue of the detected virtual call (step 310) to determine whether the class of the virtual call's receiver object is the same as the last receiver object. If so, then patching of the virtual call can easily be accomplished at step 315. At step 315, the virtual call is essentially patched and executed using the definition of the targeted method from the class of the last receiver object before returning to step 305. In other words, binder routine 205 need not be called in this situation because the last call to the targeted method used the same definition.

However, if the class of the virtual call's receiver object is not the same as the last receiver object, binder routine 205 is called (step 320) to patch the virtual call to the correct method. Steps 325–335 generally describe the process the binder routine uses to patch the virtual call.

At step 325, a target is identified from the receiver object in the virtual call. The target is typically a targeted method defined by a class of a receiver object, which is associated with the virtual call.

Next, an address identifier (such as a pointer to a memory address location) is identified at step 330. It is desirable to maintain the class of the targeted method within a restricted address space in order to minimize the size or length of the address identifier. In the exemplary embodiment, if the class of the targeted method is aligned on a kilobyte boundary within a larger address space, the lower bits of the address identifier become zero and can be disregarded. Thus, the number of instructions required to set the contents of inline cache 126 to the correct value of the address can be reduced so that the call instruction and the set instruction can fit within an atomically updatable part of memory, such as within a double-word boundary of inline cache 126.

Traditionally, there are two or more instructions required to set the value of inline cache 126 to the correct address identifier. In an embodiment using a SPARC™ computer architecture, these instructions include a set instruction and an add instruction. However, when the size of the address identifier is small enough, the add instruction may be advantageously omitted and patching the virtual call can be accomplished by updating just two instructions: the call instruction and the set instruction.

At step 332, the instructions related to the virtual call are placed within the predetermined boundary of the memory storage device. In more detail, the call instruction associated with the virtual call and the set instruction associated with the address identifier are each placed within a predetermined boundary of the memory storage device, such as inline cache 126. In the exemplary embodiment, the predetermined boundary is selected because it is the largest datum that a conventional SPARC™ computer architecture guarantees will be atomically read or written. Those skilled in the art will realize that other combinations of restricted address space and predetermined boundaries will be possible with different implementations of the present invention.

At step 335, the patching process occurs. In general, the call is patched to the targeted method and the contents of the inline cache (e.g., the set instruction) are patched to the correct address identifier value during a single instruction cycle of CPU 140. In this manner, CPU 140 atomically updates the pair of instructions.

Finally, at step 340, the virtual call has been dynamically bound to the correct definition of the targeted method and the virtual call may be executed. As a result, call is made directly to the targeted method using the patched contents of inline cache 126 to identify and execute the targeted method before returning to step 340 to detect the next virtual call.

Conclusion

Methods and systems consistent with the present invention process a virtual call during execution of a multi-threaded program by identifying a target from the virtual call, determining an address identifier associated with the target, and atomically patching the instructions for executing and identifying the target. This is typically accomplished by maintaining class definitions for the target within a restricted address space and using a memory storage device, such as inline cache 126, that is capable of being updated within a single instruction cycle of CPU 140. One of the advantages to processing a virtual call in this manner is that it can be performed during execution of a multi-threaded program without the problems associated with mismatched definitions for the targeted method. Furthermore, methods and systems consistent with the present invention advantageously allow one thread to patch the virtual call's code while other threads are safely executing it.

Finally, systems consistent with the present invention are applicable when executing multi-threaded programs written in all computer programming languages, including Java, Smalltalk-80, and C++.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. The scope of the invention is defined by the claims and their equivalents.

What is claimed is:

1. A method for processing a virtual call during execution of a multi-threaded program, comprising the steps of:
   identifying a target associated with the virtual call;
   determining an address identifier associated with the target;
   placing the virtual call and the address identifier within a predetermined boundary of a memory storage device; and
   patching the virtual call to the target while patching a contents of the memory storage device to the address identifier within a single instruction cycle.

2. The method of claim 1, wherein the determining step includes determining the address identifier to be a pointer to a memory address location within an restricted address space.

3. The method of claim 2, wherein the identifying step includes identifying the target to be a targeted method defined by a class of an object, the object being associated with the virtual call; and
   wherein the determining step further includes determining the address identifier to be associated with the class of the object.

4. The method of claim 3 further comprising the step of executing the patched virtual call using the patched contents of the memory storage device to identify and execute the targeted method.

5. The method of claim 1, wherein the patching step is executed by one of a plurality of threads in the multi-threaded program and includes patching the virtual call to the target while nearly simultaneously patching the contents of the memory storage device to the value of the address identifier such that the rest of the threads cannot interrupt patching the virtual call and patching the contents of the memory storage device.

6. The method of claim 5, wherein the patching step includes patching the virtual call to a targeted method defined by an object, which is associated with the target, while nearly simultaneously patching the contents of the memory storage device to the value of the address identifier, which is associated with a class of the object.

7. The method of claim 6, wherein the placing step further includes placing a call instruction related to the virtual call and a set instruction related to the address identifier as a pair of instructions within a double word boundary on the memory storage device as the predetermined boundary; and
   wherein the patching step further includes atomically updating the pair of instructions such that the call instruction is patched to the targeted method and the set instruction is patched to the address identifier.

8. The method of claim 7 further comprising, prior to the step of identifying the target, maintaining a class of an object associated with the target within a restricted address space in order to minimize the length of the address identifier.

9. A computer system for processing a virtual call during execution of a multi-threaded program, comprising:
   a memory storage device having a predetermined boundary and capable of being updated within a single instruction cycle; and
   a processor coupled to the memory storage device, capable of updating the memory storage device within the single instruction cycle, configured to execute the multi-threaded program, and operative to
      detect the virtual call during execution of the multi-threaded program,
      identify a target associated with the virtual call,
      determine an address identifier associated with the target, the address identifier being within a restricted address space,
      place the virtual call and the address identifier within the predetermined boundary of the memory storage device, and
      patch the virtual call to the target and patch a contents of the memory storage device to a value of the address identifier during execution of a single instruction cycle of the processor.

10. The system of claim 9, wherein the processor is further operative to determine the address identifier to be a pointer to a memory address location within the restricted address space.

11. The system of claim 10, wherein the processor is further operative to identify the target to be a targeted method defined by a class of an object, the object being associated with the virtual call; and
   wherein the processor is further operative to determine the address identifier to be associated with the class of the object.

12. The system of claim 11, wherein the processor is further operative to execute the patched virtual call using the patched contents of the memory storage device to identify and execute the targeted method.

13. The system of claim 9, wherein the processor is further operative to execute one of a plurality of threads in the multi-threaded program in order to patch the virtual call and patch the contents of the memory storage device in a nearly simultaneous manner such that the rest of the threads being executed by the processor cannot interrupt the patch of the virtual call by the processor and the patch of the contents of the memory storage device by the processor.

14. The system of claim 13, wherein the processor is further operative to update the virtual call to be a call instruction to a targeted method defined by an object, which is associated with the target, while nearly simultaneously updating the contents of the memory storage device to the value of the address identifier, which is associated with a class of the object.

15. The system of claim 14, wherein the processor is further operative to:
   place a call instruction related to the virtual call within a double word boundary on the memory storage device as the predetermined boundary;
   place a set instruction related to the address identifier within a double word boundary on the memory storage device; and
   automically updating the call instruction to the targeted method while updating the set instruction to the value of the identified address identifier.

16. The system of claim 9, wherein the memory storage device maintains the class of the object within the restricted address space in order to minimize the length of the address identifier.

17. A computer-readable medium containing instructions for processing a virtual call during execution of a multi-threaded program, which when the instructions are executed, comprise the steps of:
   identifying a target associated with the virtual call;
   determining an address identifier associated with the target, the address identifier being within a restricted address space;

placing the virtual call and the address identifier within a predetermined boundary of a memory storage device; and patching the virtual call to the target while patching a contents of the memory storage device to the address identifier within a single instruction cycle.

18. The computer-readable medium of claim 17, wherein the determining step includes determining the address identifier to be a pointer to a memory address location within the restricted address space.

19. The computer-readable medium of claim 18, wherein the identifying step includes identifying the target to be a targeted method defined by a class of an object, the object being associated with the virtual call; and wherein the determining step further includes determining the address identifier to be associated with the class of the object.

20. The computer-readable medium of claim 19 further comprising the step of executing the patched virtual call using the patched contents of the memory storage device to identify and execute the targeted method.

21. The computer-readable medium of claim 17, wherein the patching step is executed by one of a plurality of threads in the multi-threaded program and includes patching the virtual call to the target while nearly simultaneously patching a contents of the memory storage device to the value of the address identifier such that the rest of the threads cannot interrupt patching the virtual call and patching the contents of the memory storage device.

22. The computer-readable medium of claim 21, wherein the placing step further includes placing a call instruction and a set instruction within a double word boundary on the memory storage device as the predetermined boundary; and wherein the patching step further includes atomically updating the call instruction to a targeted method while updating the set instruction to reflect the value of the address identifier, the targeted method being defined by an object associated with the target.

23. The computer-readable medium of claim 22 further comprising, prior to the step of identifying the target, maintaining a class of the object within a restricted address space in order to minimize the length of the address identifier.

* * * * *

UNITED STATES PATENT AND TRADEMARK OFFICE
CERTIFICATE OF CORRECTION

PATENT NO. : 6,401,137 B1 Page 1 of 1
DATED : June 4, 2002
INVENTOR(S) : Mario Iwan Wolczko et al.

It is certified that error appears in the above-identified patent and that said Letters Patent is hereby corrected as shown below:

Column 9,
Line 19, "an restricted" should read -- a restricted --; and

Column 10,
Line 53, "automically" should read -- atomically --.

Signed and Sealed this

Tenth Day of September, 2002

Attest:

Attesting Officer

JAMES E. ROGAN
Director of the United States Patent and Trademark Office